United States Patent [19]

Davidson

[11] Patent Number: 5,658,043

[45] Date of Patent: Aug. 19, 1997

[54] INERTIA LOCK FOR SIDE-MOUNTED ARMREST

[75] Inventor: Russell K. Davidson, Dearborn, Mich.

[73] Assignee: Lear Corporation, Southfield, Mich.

[21] Appl. No.: 579,793

[22] Filed: Dec. 28, 1995

[51] Int. Cl.$^6$ ........................................ B60N 2/46
[52] U.S. Cl. .................. 297/113; 297/216.1; 297/411.32
[58] Field of Search ........................ 297/113, 216.1, 297/216.14, 378.11, 411.32

[56] References Cited

U.S. PATENT DOCUMENTS

| | | |
|---|---|---|
| 2,873,794 | 2/1959 | Leslie et al. . |
| 3,549,202 | 12/1970 | Boschen et al. . |
| 3,909,063 | 9/1975 | Bonisch et al. . |
| 4,318,569 | 3/1982 | Bilenchi et al. ............... 297/378.11 |
| 4,579,384 | 4/1986 | Sharod . |
| 4,634,182 | 1/1987 | Tanaka ....................... 297/378.11 |
| 4,655,501 | 4/1987 | Ishigami et al. . |
| 4,733,912 | 3/1988 | Secord . |
| 4,846,526 | 7/1989 | Allen . |
| 4,909,571 | 3/1990 | Vidwans et al. . |
| 4,973,017 | 11/1990 | Takagi . |
| 5,100,202 | 3/1992 | Hughes ........................ 297/378.11 |
| 5,265,937 | 11/1993 | Allen ........................... 297/378.11 |
| 5,476,307 | 12/1995 | Whalen ..................... 297/411.32 X |

FOREIGN PATENT DOCUMENTS

| | | |
|---|---|---|
| 2502727 | 8/1975 | Germany . |
| 2641587 | 3/1978 | Germany ................... 297/378.11 |
| 3701419 | 7/1988 | Germany ................... 297/378.11 |

*Primary Examiner*—Peter R. Brown
*Attorney, Agent, or Firm*—Howard & Howard

[57] ABSTRACT

A seat assembly (10) for use in automotive vehicles includes a seat frame (18) and an armrest frame (20) that is pivotally supported on the seat frame (18) for pivotal movement between an armrest position and an upright position. An inertia lock member (26) that is pivotally supported on the armrest frame (20) pivots into engagement with a stop member (24) that is supported on the seat frame (18) when the armrest (16) is in the upright position and subjected to a predetermined inertia force (31) under certain vehicle deceleration conditions. The inertia lock member (26) is operative to maintain the armrest (16) in the upright position and allows a seat occupant to move the armrest (16) into an armrest support position under normal use conditions.

16 Claims, 2 Drawing Sheets

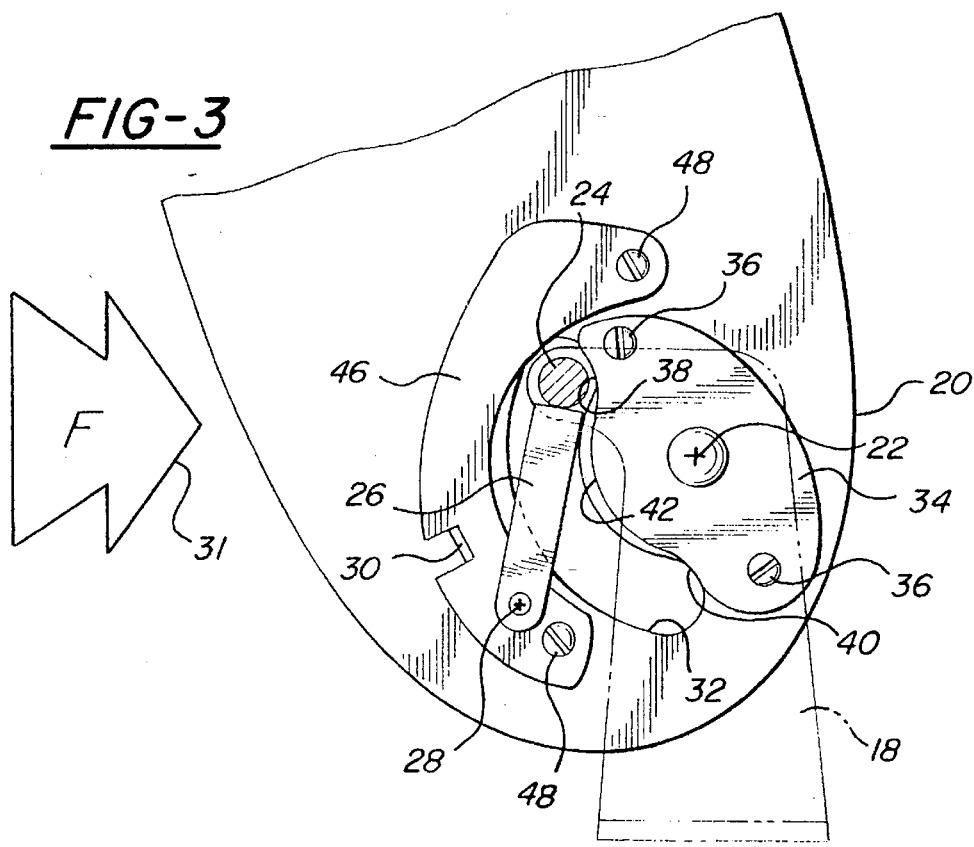
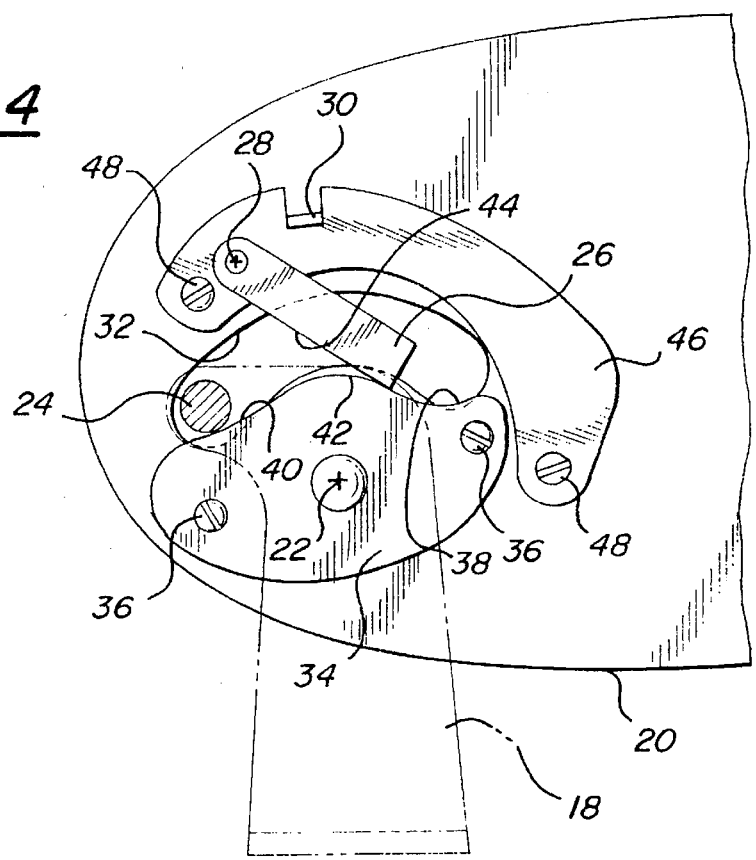

5,658,043

INERTIA LOCK FOR SIDE-MOUNTED ARMREST

BACKGROUND OF THE INVENTION

The invention relates generally to an armrest assembly for use in automotive vehicles and, more specifically, to an assembly including an inertia lock member for preventing movement of an armrest from an upright position when the vehicle is subjected to certain deceleration conditions.

Armrests are provided in most modern day automotive vehicles. Typically, the armrest is mounted to the side of the seat and is movable between and upright position and an armrest or use position. A problem presented by conventional armrests is that the armrest may fall forward from the upright position when the vehicle is suddenly stopped, for example.

Various devices have been developed for preventing seat backs from unexpectedly moving forward when a vehicle is subjected to certain deceleration conditions. Such devices are relatively complex and depend upon the hardware typically used for connecting the seat back to a seat cushion frame. Therefore, such devices are not useful for maintaining an armrest in an upright position relative to a seat back.

One type of armrest lock is described in U.S. Pat. No. 4,579,384, issued to Sidney J. Sharod on Apr. 1, 1986. The Sharod armrest lock has a relatively complex linkage mechanism that can prove prohibitively expensive in some application. Further, the Sharod armrest lock depends upon an interaction between more than one moving piece, which introduces the possibility that the lock will not perform reliably.

Accordingly, it is desirable to provide an armrest lock that is economically feasible and reliable. This invention meets those objectives by providing an effective, economical armrest lock that can be implemented on most armrests without requiring any significant modification of the existing armrest structure.

SUMMARY OF THE INVENTION

In general terms, this invention is a seat assembly including a seat frame and an armrest frame that is pivotally supported by the seat frame for pivotal movement between an armrest position and an upright position. A stop member is supported on the seat frame to remain stationary relative to the seat frame. The assembly is characterized by an inertia lock member pivotally supported on the armrest frame for pivotal movement into engagement with the stop member when the armrest frame is in the upright position and subjected to a predetermined inertia force in a predetermined direction for preventing movement of the armrest frame from the upright position under certain vehicle deceleration conditions.

BRIEF DESCRIPTION OF THE DRAWINGS

Various features and advantages of this invention will become apparent to those skilled in the art from the following detailed description of the preferred embodiment when considered in conjunction with the accompanying drawings, wherein:

FIG. 3 is a view like FIG. 2 but subjected to an inertia force; and

FIG. 4 is a view similar to FIG. 2 but showing the armrest in an armrest position.

DETAILED DESCRIPTION OF THE PREFERRED EMBODIMENT

Figure 1:
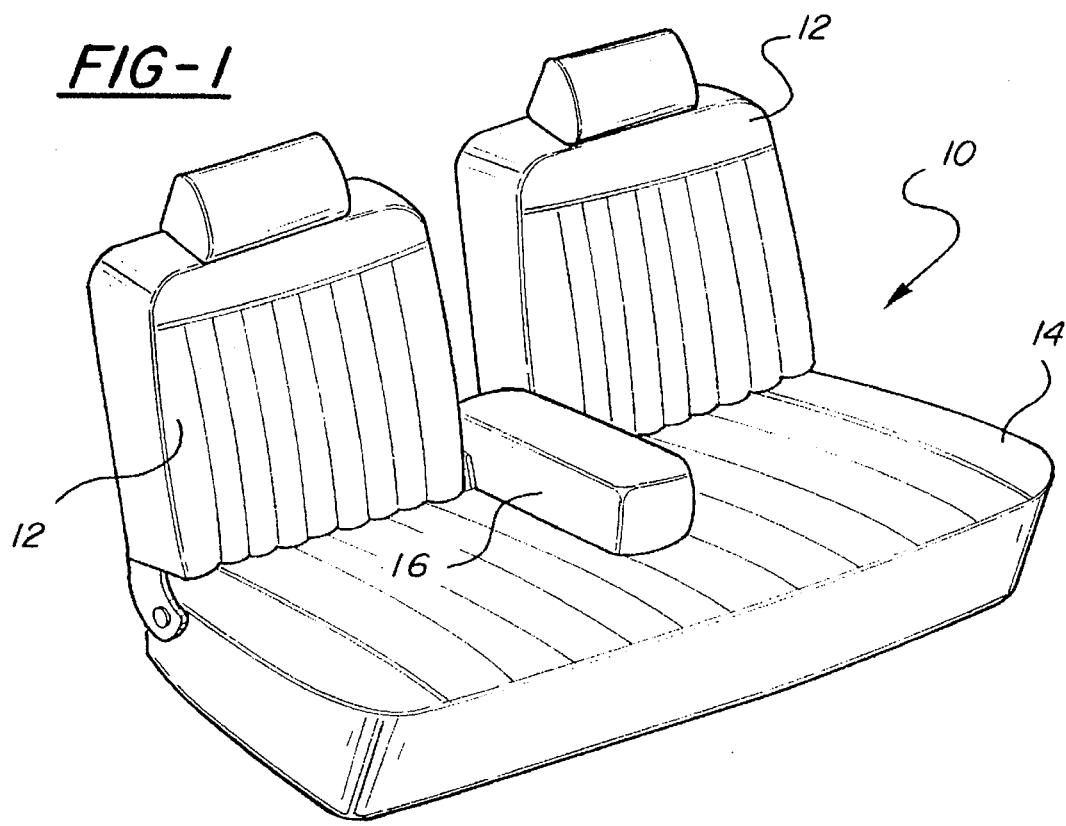
FIG. 1 is a perspective view of a seat for use in automotive vehicles.
Figure 2:
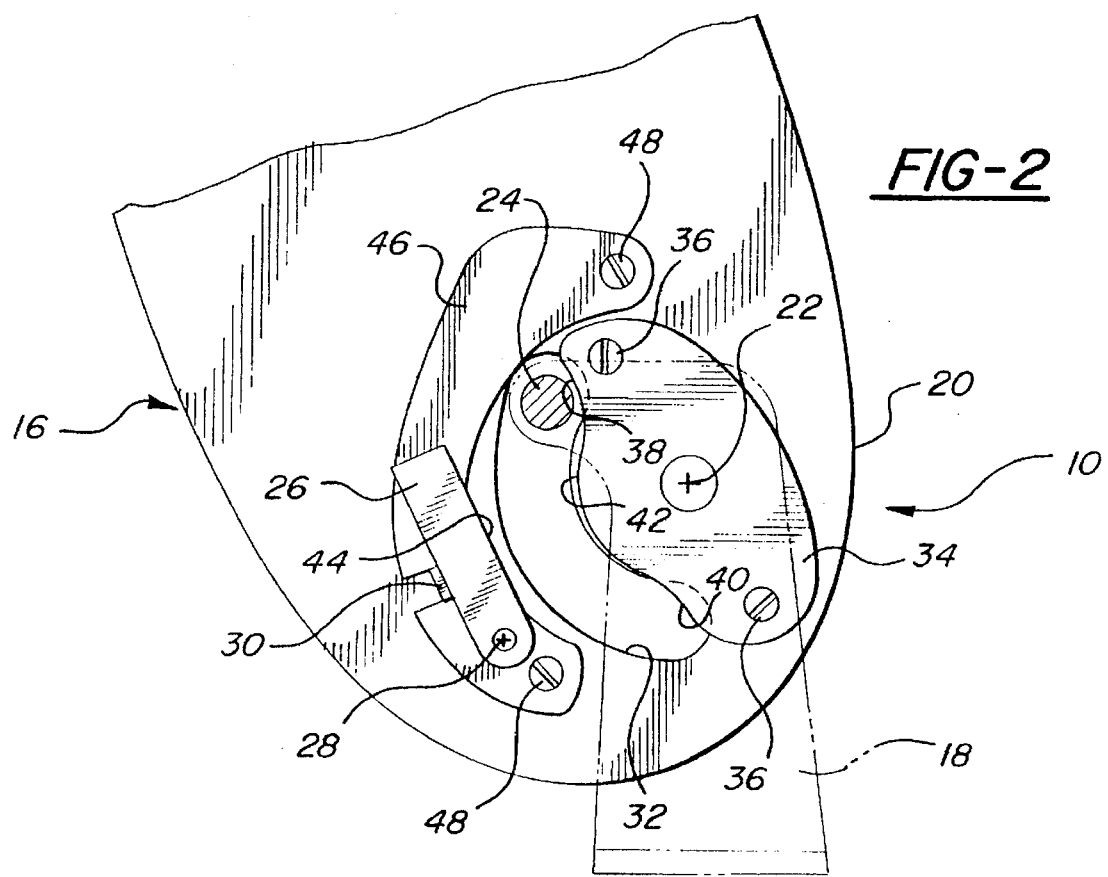
FIG. 2 is a fragmentary, elevational view of an armrest lock assembly design invention, showing the armrest in an upright position.

FIG. 1 is a perspective view of a vehicle seat 10 including seatback 12 and seating surface 14. An armrest 16 is pivotally mounted for pivotal movement relative to seatback 12 between an upright position, as shown in FIGS. 2 and 3, wherein armrest 16 is generally aligned with seatback 12, and an armrest position as illustrated in FIGS. 1 and 4. When the armrest 16 is in the armrest position, it is generally horizontal and capable of supporting a load.

FIG. 2 illustrates selected components of seat assembly 10. A seat frame includes a portion 18, which is disposed along one edge of seatback 12. An armrest frame 20 is pivotally supported by the seat frame 18 for pivotal movement about pivot point 22 between an armrest position and an upright position. The armrest frame 20 is illustrated in the upright position in FIG. 2. A stop member 24 is supported on the seat frame 18 and remains stationary relative to the seatback 12. An inertia lock member 26 is pivotally supported on the armrest frame 20 for pivotal movement into engagement with the stop member 24 when the armrest frame 20 is in the upright position and is subjected to a predetermined inertia force under certain vehicle deceleration conditions. The inertia lock member 26 moves into engagement with the stop member 24 to prevent movement of the armrest frame 20 from the upright position in this deceleration condition. The inertia lock member 26 pivots relative to the armrest frame 20 about pivot point 28 which is defined by a rivet, or the like.

When the armrest frame 20 is placed in the upright position (as illustrated in FIG. 2) the inertia lock member 26 is gravitationally biased against the rest member 30. When the vehicle decelerates the armrest frame 20 and the inertia lock member 26 are subjected to an inertia force in the direction of force arrow 31, as illustrated in FIG. 3. Under certain deceleration conditions, the inertia lock member 26 pivots about pivot point 28 and moves into engagement with the stop member 24, which prevents the armrest frame 20 from moving in a clockwise direction (according to the drawing) from the upright position. The inertia lock member 26 is preferably of a sufficient size and weight to be moved into engagement with the stop member 24 when subjected to an inertia force having a magnitude of 1 g and in a direction as generally illustrated by arrow 31.

The armrest frame 20 includes a generally arcuate slot 32. The stop member 24 is in the form of a pin that protrudes through arcuate slot 32. As the armrest frame 20 is pivoted about the pivot point 22 relative to the seat frame 18, the stop member 24 effectively moves along the arcuate slot 32. Although the illustrated embodiment includes the arcuate slot 32, other opening shapes can be used. The illustrated slot 32 provides a minimum clearance for the pin 24 to protrude from the seat frame 18 through the armrest frame 20.

The seat assembly 10 preferably includes a cam plate 34, which is attached to the armrest frame 20 by screws 36. Although the screws 36 are illustrated in FIGS. 2–4, any conventional fastener can be used to attach cam plate 34 to the armrest frame 20. The cam plate 34 remains stationary relative to the armrest 20 and, therefore, pivotally moves about the pivot point 22 when the armrest frame 20 pivots relative to the seat frame 18. The cam plate 34 includes a first abutment surface 38 for abutting the stop member 24 when the armrest frame 20 is in the upright position. As can be appreciated from FIGS. 2 and 3, the abutment surface 38 prevents the armrest frame 20 from rotating counter-clockwise relative to the seat frame 18 because it abuts against the stop member 24. A second abutment surface 40 is provided near an opposite end of the cam plate 34. A second abutment surface 40 abuts the stop member 24 when the armrest frame 20 is in the armrest position as illustrated in FIG. 4.

When a seat occupant intends to fold the armrest 16 from the upright position into the armrest position, the inertia lock member 26 remains against rest member 30 as the user initiates movement of the armrest frame 20 toward the armrest position. The position of the inertia lock member 26 is preferably arranged such that it is gravitationally biased toward the rest member 30 until its forward distal end moves over the stop member 24 whereupon the inertia lock member 26 falls away from rest member 30 and will rest against the cam plate 34.

A limiting portion 42 extends between the first abutment surface 38 and the second abutment surface 40 on the cam plate 34. A limiting portion 42 limits the pivotal movement of the lock member 26 about the pivot point 28. As can be appreciated from FIG. 3, as the lock member 26 moves in a generally clockwise direction (according to the drawing) it will engage or abut the limiting portion 42 and will not rotate any further. The limiting portion 42, therefore, prevents the inertia lock member 26 from moving too far such that it will not properly engage the stop member 24. Similarly, the limiting portion 42 prevents the inertia lock member 26 from moving beyond a desired position when the armrest frame 20 is placed in the armrest position illustrated in FIG. 4. When the armrest frame 20 is placed in the armrest position, the inertia lock member 26 is gravitationally biased downward away from the rest member 30 and into engagement with the limiting portion 42.

The inertia lock member 26 includes a bearing surface 44 that bears against the stop member 24 as the armrest frame 20 is moved from the armrest position into the upright position. As the armrest frame 20 is moved in a counter-clockwise direction from the position illustrated in FIG. 4, the stop member 24 relatively moves to the right (according to the drawing) along arcuate slot 32. As the stop member 24 travels along the arcuate slot 32 it eventually contacts the bearing surface 44 on the inertia lock member 26 and urges the lock member 26 toward the rest member 30, where it is gravitationally biased into a rest position.

The presently preferred embodiment also includes a lock plate 46, which is secured to the armrest frame 20 by the fasteners 48. The lock plate 46 is fixed relative to the armrest 20 and moves with the armrest 20 as it pivots about the pivot point 22. The rest member 30 is preferably formed as a notch in the lock plate 46, as shown.

Variations and modifications to the disclosed embodiment that do not depart from the purview and spirit of this invention will become apparent to those skilled in the art. For example, it is possible to modify the armrest frame 20 such that abutment surfaces 38 and 40 and limiting portion 42 are formed on the armrest frame 20 without requiring a cam plate 34. Similarly, the rest member 30 can be formed on the armrest frame 20, rather than on a separate locking plate 46.

Accordingly, the preceding description is exemplary rather than limiting in nature. The scope of this invention is to be limited only by the appended claims wherein reference numerals are provided for convenience only and are not to be construed as limiting in any way.

What is claimed is:

1. A seat assembly, comprising:

a seat frame;

an armrest frame pivotally supported by said seat frame for pivotal movement between an armrest position and an upright position;

a stop member supported on said seat frame; and an inertia lock member pivotally supported on said armrest frame for pivotal movement into engagement with said stop member upon said armrest frame being in said upright position and being subjected to a predetermined inertia force during a deceleration condition for preventing movement of said armrest frame from said upright position in said deceleration condition and a cam plate (34) supported on said armrest frame (20) for movement with said armrest frame and wherein said cam plate (34) includes a first abutment surface (38) for abutting said stop member (24) when said armrest frame is in said armrest position.

2. The assembly (10) of claim 1, wherein said armrest frame (20) includes a rest member (30) and said lock member (26) is gravitationally biased against said rest member when said armrest frame is in said upright position.

3. The assembly (10) of claim 2, wherein said lock member (26) includes first and second ends and wherein said lock member pivots relative to said armrest frame about a pivot axis (28) proximate said first end.

4. The assembly (10) of claim 3, wherein said lock member (26) engages said stop member (24) at said second end.

5. The assembly (10) of claim 4, wherein said lock member (26) includes a bearing surface (44) that extends between said first and second ends and bears against said stop member (24) when said armrest frame (20) is moved from said armrest position toward said upright position for moving said lock member toward said rest member (30).

6. The assembly (10) of claim 5, wherein said lock member (26) has a length, a width and a thickness and wherein said length is greater than said width and said width is greater than said thickness.

7. The assembly (10) of claim 6, wherein said lock member (26) is substantially flat and generally rectangular.

8. The assembly (10) of claim 1, wherein said cam plate (34) further includes a second abutment surface (40) for abutting said stop member (24) when said armrest frame (20) is in said upright position.

9. The assembly (10) of claim 8, wherein said cam plate (34) further includes a limiting portion (42), between said first and second abutment surfaces, for engaging said lock member (26) and limiting movement of said lock member responsive to said inertia force.

10. The assembly (10) of claim 4, wherein said armrest frame includes a generally arcuate slot (32) for receiving said stop member (24), said slot including a first end near said cam plate first abutment surface and a second end near said cam plate second abutment surface such that said stop member effectively moves along said slot from a position near one of said ends to another position near the other said end as said armrest frame (20) pivots between said upright and armrest positions.

11. The assembly (10) of claim 10, wherein said limiting portion (42) is a generally arcuate surface extending between said first and second abutment surfaces and wherein said generally arcuate surface of said limiting portion is disposed proximate a central portion of said arcuate slot (32) that extends between said slot first end and said slot second end.

12. The assembly of (10) claim 10, wherein said stop member (24) comprises a pin that protrudes through said arcuate slot (32).

13. The assembly (10) of claim 1, wherein said armrest frame (20) pivots between said upright and armrest positions about a pivot axis (22) that is defined through said cam plate (34).

14. The assembly (10) of claim 1, further comprising a lock plate (46) supported for movement with said armrest frame (20), said inertia lock member (26) being pivotally coupled to said lock plate.

15. The assembly (10) of claim 14, wherein said lock plate (46) includes a rest member (30) and said inertia lock member (26) is gravitationally biased into said rest member when said armrest frame is in said upright position.

16. The assembly of claim 15, wherein said rest member (30) comprises a notch defined on said lock plate (46).

* * * * *